Feb. 17, 1953 N. L. MABREY 2,628,702
CONVEYER TRANSFER APPARATUS
Filed Jan. 4, 1951 3 Sheets-Sheet 1

INVENTOR.
Nelson L. Mabrey
BY
Bean, Brooks, Buckley & Bean.
ATTORNEYS

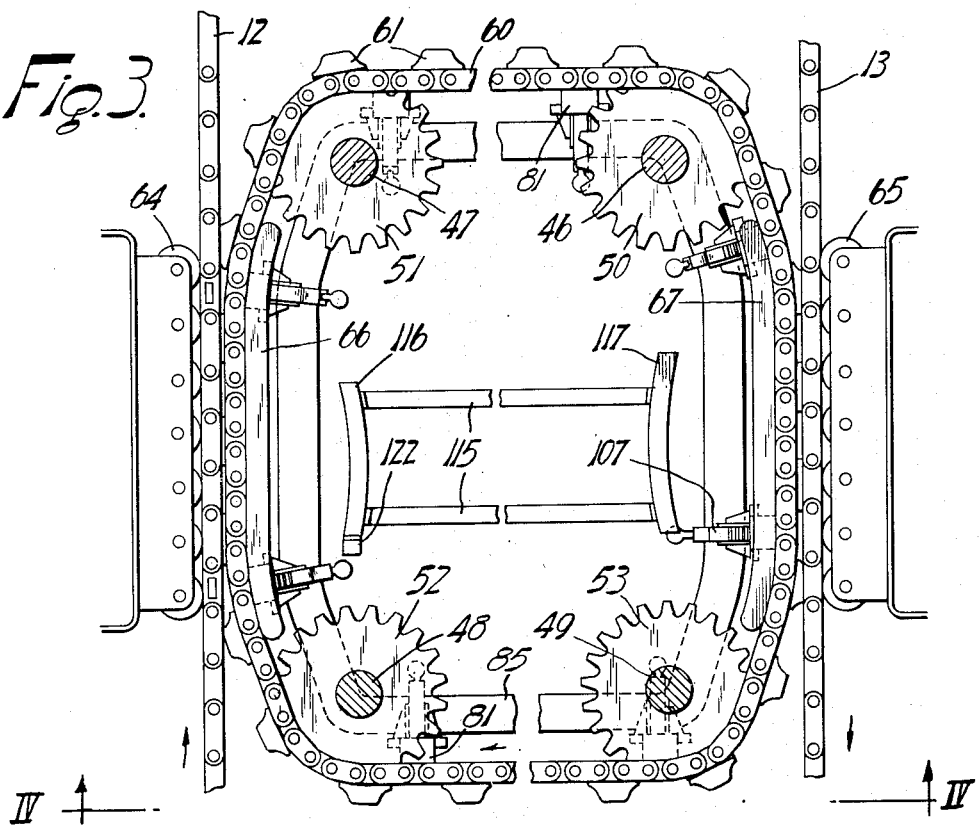
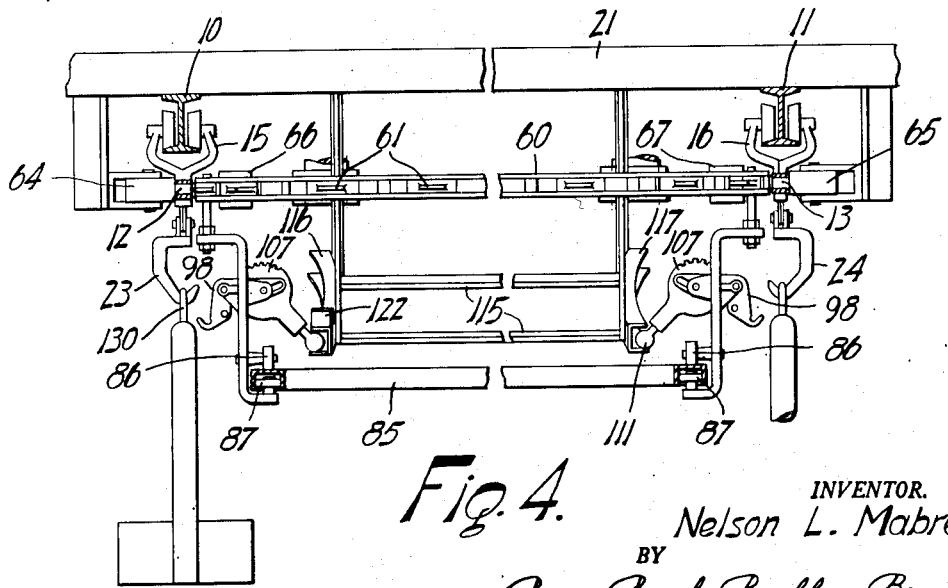

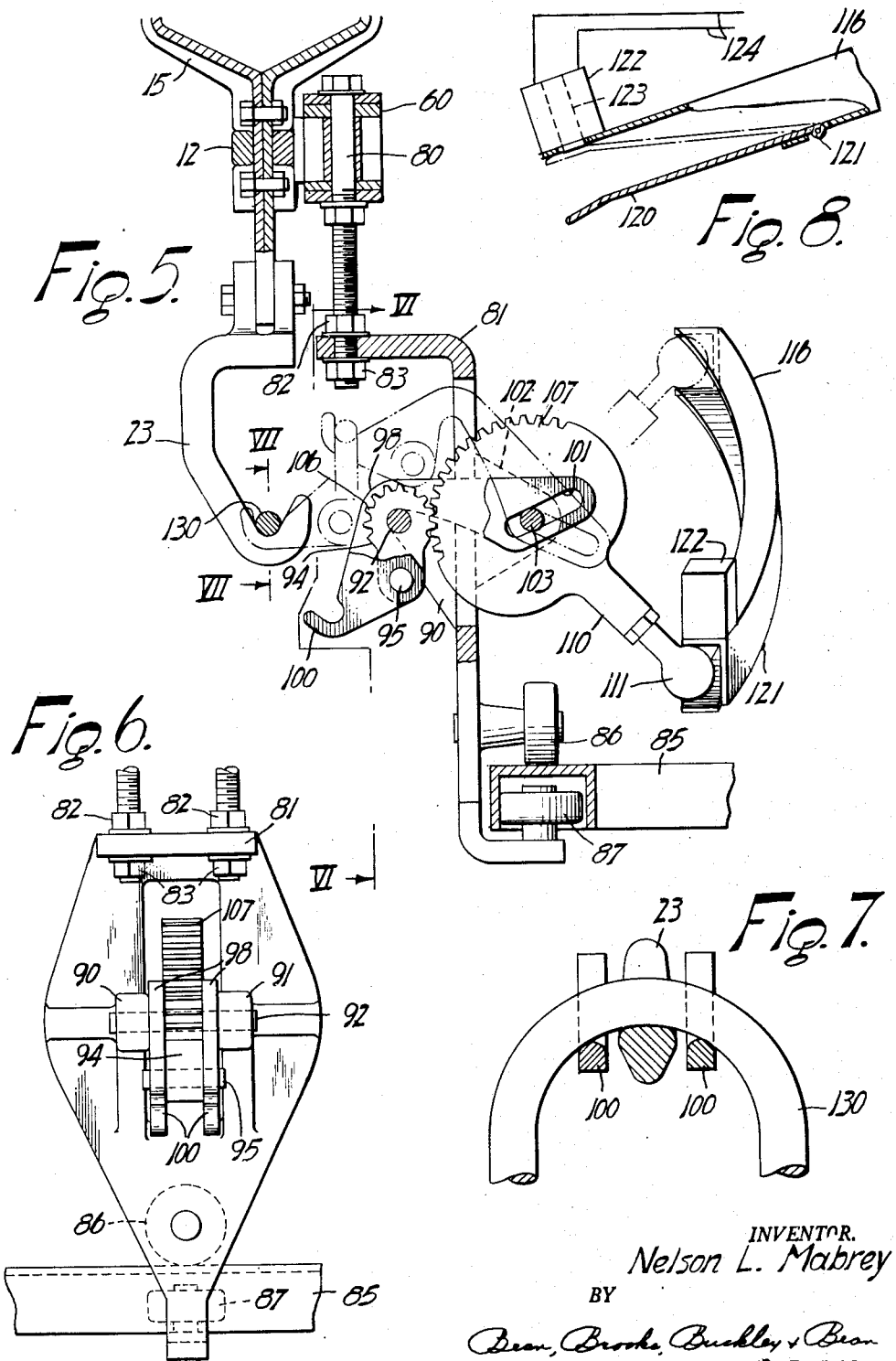

Patented Feb. 17, 1953

2,628,702

UNITED STATES PATENT OFFICE 2,628,702

CONVEYER TRANSFER APPARATUS

Nelson L. Mabrey, Buffalo, N. Y.

Application January 4, 1951, Serial No. 204,437

6 Claims. (Cl. 198—27)

This invention relates to conveying apparatus and particularly to a method and means for transferring articles or material from one endless conveyor to another in transit and without halting either of the conveyors.

The principles of the present invention are especially adaptable to continuous overhead conveyors which are generally known as overhead trolley conveyors. Such conveyors conventionally comprise an endless chain driven by sprockets and with the links of the chain suspended from a series of roller supports or trolleys which roll along a fixed trackway which overlies the chain.

The problem of automatically transferring loads from one such conveyor to another is complicated by the fact that the conveyor chain links are not readily synchronized.

Even when one considers only a single continuous conveyor chain of this general type, the pitch of successive links is not constant due to accumulated clearances, tolerances, wear, and normal manufacturing variations. For instance, if chain links are manufactured to a nominal pitch of 4 inches, a stretch of 100 links, instead of measuring 400 inches, might measure as little as 390 inches or as much as 410 inches. These figures are not intended to establish the actual limits or degree of variation but are merely by way of illustration.

This situation has been an important factor in necessitating the development of special drive means for chain conveyors of this class where the length of the endless chain is such that it is inexpedient to drive the conveyor from a single drive sprocket or drive sprocket assembly. In such cases all of the several driving devices which may be spaced along the conveyor chain at various points, or all but one of the driving devices, are mounted on frames which are free to float in the direction of travel of the conveyor chain but are normally centered or biased to a given position by spring devices.

Thus, a tendency to overload a given drive assembly, by reason of variation in chain pitch or otherwise, will cause the supporting frame of the drive to yield backwardly with respect to the direction of travel of the chain and a tendency to underload a given drive unit will result in its supporting frame moving forwardly to assume a more equal portion of the driving load.

The present invention involves basically a combined synchronizing and transfer system for two independent, endless conveyors of this class which operates to synchronize the links of the two conveyors at a given transfer point, despite the fact that chain pitch variation may be such that the conveyor chains are not synchronized at any other points along their extent. This synchronizing arrangement includes mechanism for automatically transferring a load from one conveyor to the other, taking the load from and delivering it to the two chains at links which are in accurate synchronism as a result of the operation of the synchronizing mechanism.

Means have previously been proposed for synchronizing two otherwise independent conveyors by means of extraneous drive control means, but the present apparatus is fundamentally novel in that it provides a single mechanism which performs the dual function of bringing about the required local synchronization and, at the same time, actually effecting automatic transfer of successive loads from one to the other of the thus synchronized conveyor zones. To merely bring about a general synchronization of a pair of conveyors for transfer or other purposes is impractical because of the link pitch variation hereinbefore referred to. To merely synchronize the separate drive units of two conveyor systems cannot serve the purposes of the present invention, and therein lies the importance of synchronizing the conveyor chains, not generally, but with respect to given points on each of the two conveyors which points represent, respectively, the take-off and loading points of the two conveyor chains.

Since the actual automatic transfer is effected by the same mechanism which brings about the required local synchronization, there is no possibility of the synchronizing and transferring mechanisms becoming improperly related. To put it another way, if the synchronizing means and the transferring means are independent entities, it is then necessary not only to synchronize the transfer zones of the two conveying chains, but it is further necessary to synchronize the transfer mechanism with the conveying chains.

A common method of driving conveyor means of this class is by means of a caterpillar chain which passes over a pair of sprockets, one of which is a power-operated driver. This caterpillar driving chain carries teeth similar to a drive sprocket but differs from a drive sprocket in that a number of teeth along the driving chain may engage the conveying chain simultaneously to effectively drive the same, whereas with a mere driving sprocket only one tooth thereof would effectively engage the conveyor chain, unless the latter wrapped around the sprocket to some extent. Ordinarily sprocket drives are, of course, employed where the conveyor changes its direction materially for other reasons so that the conveyor chain will naturally wrap around the driving sprocket to a sufficient degree for effective driving.

The conveying and transferring means of the present invention is illustrated, by way of example only, in conjunction with a caterpillar driving chain arrangement of the kind referred to in the preceding paragraph. However, it is to be understood that the same principles of combined synchronization and transfer could be applied in the case of a single sprocket synchronizing arrangement.

The synchronizing and transferring arrangement of the present invention may be incorporated with a driving unit for the conveyor chains and is so illustrated, again by way of example, in the present specification and drawings. However, the synchronizing and transferring mechanism may comprise merely idler mechanism driven from the respective conveyor chains without independent power application without altering the principles of operation of the invention.

Again, the conveying and transfer mechanism may comprise a fixed non-floating mechanism, in which case any other remote driving stations would preferably be of the floating type to permit proper operation. In the form shown herein by way of example, however, the synchronizing and transfer mechanism is shown as comprising a floating frame which accommodates itself lineally with respect to the conveyor chains. Obviously, this floating of the synchronizing and transfer mechanism in the direction of movement of the conveyor chains in effect carries the synchronized transfer points along with it and does not disturb the accurately timed and registered transfer of loads from one conveyor to the other.

It is desired that proper account be taken of the possibility that the station on the second conveyor chain to which a load is to be transferred may be occupied, as by failure of a worker to properly remove a given load at some earlier point along the second conveyor. Means are provided whereby the transferring device will not operate unless the station to which transfer is to be made is free to receive the transferred load.

Various modifications may be made in the construction and arrangement of the apparatus of the present invention and the manner in which it is associated with the conveyors and the conveyor driving means without departing from the principles of the present invention. The single specific embodiment set forth in detail herein is by way of example only, and the scope of the present invention is not limited thereto or otherwise than as defined in the appended claims.

In the drawings:

Fig. 3 is a view similar to Fig. 2 but on a larger scale and with a portion of the overlying structure broken away for added illustration as indicated by the line III—III of Fig. 1;

Fig. 4 is a cross-sectional view taken approximately on the line IV—IV of Fig. 3;

Fig. 5 is an enlarged fragmentary view taken similarly to Fig. 4, but showing only the left-hand portion of the latter, generally in cross-section;

Fig. 6 is a fragmentary cross-sectional view taken approximately on the line VI—VI of Fig. 5;

Fig. 7 is a fragmentary cross-sectional view on the line VII—VII of Fig. 5; and

Fig. 8 is a fragmentary side elevational view of the entrance portion of one of the transfer cam elements.

Figure 2:
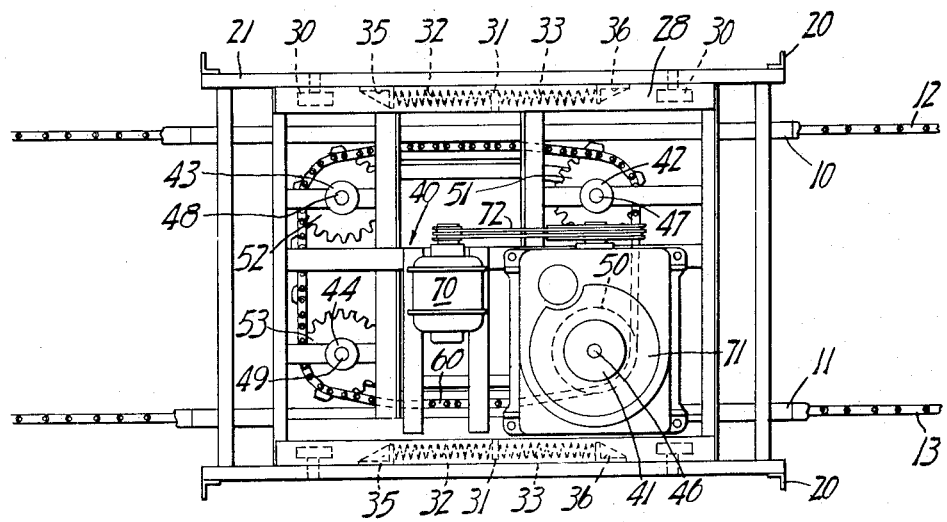
Fig. 2 is a top plan view thereof.
Figure 1:
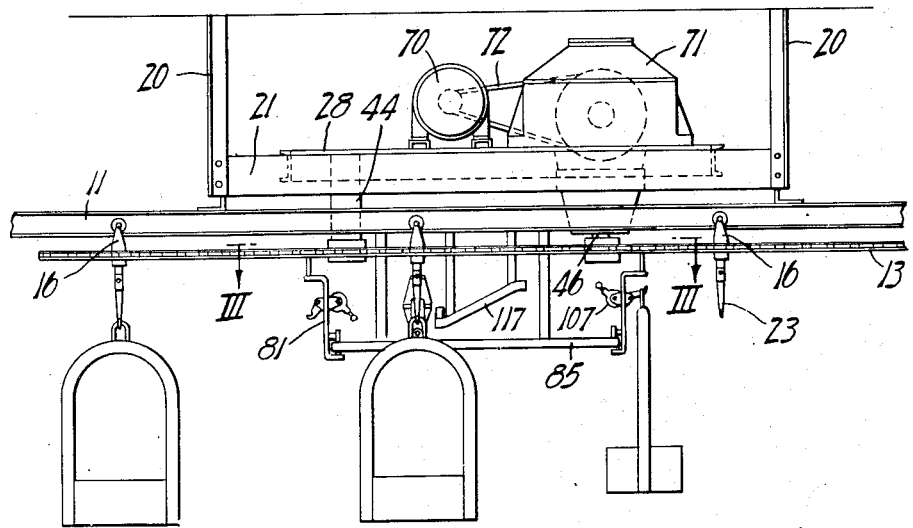
Fig. 1 is a general elevational view of one form of apparatus embodying the principles of the present invention.

Throughout the several figures of the drawings like characters of reference denote like parts, and the numerals 10 and 11 designate the supporting monorails of a pair of overhead trolley conveyors, such conveyors including conventional conveying chains 12 and 13, respectively, which are suspended from the monorails by a series of trolleys 15 and 16, respectively, as shown in Fig. 4.

The monorails 10 and 11 are fixed to overlying building structure in various ways and at various points along their lengths, one such support comprising depending angle bars 20 and a rigid rectangular framework 21 suspended therefrom. The trolleys 15 and 16, in addition to their upper tracking engagement with the monorails 10 and 11 and their intermediate connection with the chains 12 and 13, all of which is conventional, terminate at their lower ends, in the present instance, in hooks 23 and 24, respectively, which is likewise conventional construction.

As stated hereinbefore the synchronizing and transferring apparatus which is shown herein by way of example is shown in conjunction with means for driving the conveyor chains, which means may be in addition to other driving stations at one or more points around the respective conveyors. The driving, synchronizing, and transfer mechanism is all supported by a generally horizontal rectangular frame 28, which rides upon idler rollers 30 supported by the stationary framework 21, so that the frame 28 is mounted for movement in a direction parallel to the direction of movement of the conveyor chains.

The frame 28 is normally spring biased to an intermediate position with respect to frame 21, considered longitudinally. Abutments 31 project outwardly from the opposite side portions of frame 28 and compression coil springs 32 and 33 seat against opposite sides of the abutments 31. The opposite or outer ends of the springs 32 and 33 seat against brackets 35 and 36 which are fixed to the adjacent portions of framework 21.

Thus, the springs normally bias frame 28 to the position illustrated but permit lengthwise movement against the resistance of the springs to accommodate unequal loading of the driving devices and to permit the mechanism to shift lengthwise to facilitate reaching a condition of synchronism as between a given link of chain 12 and a corresponding link of chain 13. It is to be understood that the floating mounting thus briefly described is not new but is well-known in this art for use purely as a driving means for a single conveyor chain. Its use in conjunction with the synchronizing and transfer mechanism which will now be described is novel, but the provision of a floating mounting is not an indispensable characteristic of the combined synchronizing and transfer mechanism which is the subject of the present invention.

The frame 28 includes various fixed intermediate horizontal bars which extend transversely and longitudinally for supporting the following transmission means, which bars are merely designated generally 40 and need not be described in further detail. Referring to the frame 28 generally, four vertical bearings 41, 42, 43, and 44 are supported thereby for rotatably supporting, respectively, a drive shaft 46 and idler shafts 47, 48, and 49. These shafts have fixed thereto sprockets designated 50 through 53, respectively.

The shafts 46 through 49 project downwardly from frame 28 so that the sprockets 50 through 53 are in the same horizontal plane as chains 12 and 13 of the two conveyors. The numeral 60 designates a caterpillar chain which tracks over the four sprockets and has outwardly projecting teeth 61 which mesh with both of the conveyor chains 12 and 13. A caterpillar chain of this type is commonly used for driving a single conveyor chain, in which case only two sprockets are employed for supporting the same, one a driving sprocket and one an idler sprocket.

As shown in Fig. 3, the conveyor chains 12 and 13 are backed up by sets of idler rollers 64 and 65, respectively, and the caterpillar chain 60 tracks over relatively fixed guides 66 and 67, which are commonly known as back-up bars, so that its teeth 61 mesh with conveyor chains 12 and 13, respectively. An electric driving motor 70 is belt-connected to a reducing gear 71 as at 72, and the output shaft of reducer 71 may comprise the drive shaft 46 of sprocket 50.

Conveyor chains of this general class are sometimes provided with Reeves drives or other variable ratio transmissions between the driving motor and the sprocket drive shaft and such variable speed transmission may be incorporated in the present apparatus if desired. So much of the caterpillar chain and sprocket arrangement as has thus far been described brings about synchronization as between the links of the conveyor chains 12 and 13 at least for such portions of chains 12 and 13 as are in tracking engagement with the teeth 61 of caterpillar chain 60.

The transfer mechanism can thus operate upon loads in transit in timed relation with the synchronizing means and is afforded ample opportunity to take a load from one conveyor and deposit it on the other while both are continuously in motion and regardless of their joint rate of movement, just as long as the pick-up and deposit are each accomplished during the time when the respective portions of the chains 12 and 13 from which the load is taken and deposited are in mesh with caterpillar chain 60.

The actual transfer mechanism is generally supported from and operated by movement of the synchronizing means and, while the transfer mechanism may assume a wide variety of mechanical forms, one form of actual transfer mechanism will now be described by way of example.

It is to be understood that load-supporting hooks 23 and 24 will not usually be associated with each link of conveyor chains 12 and 13 but will be spaced at a pitch equivalent to a predetermined multiple of the pitch of the links, depending on the size of the articles being conveyed or the article carriers. Whatever the spacing of the hooks 23 and 24, the caterpillar chain 60 will be provided with transfer assemblies which are similarly spaced along the caterpillar chain and in registry with the links carrying the hooks 23 and 24.

One such transfer device is shown in detail in Figs. 5 and 6 and includes mechanism for automatically lifting a load from a hook 23, carrying the same about to a position of alignment with conveyor chain 13, and then depositing the same on a hook 24 thereof.

Referring to Fig. 5, the numeral 80 designates a stud or bolt which replaces one of the usual connecting pins between a pair of adjacent chain links of caterpillar chain 60. Stud 80 extends below chain 60 and has adjustably fixed thereto a bracket 81, vertical adjustment being effected by means of nuts 82 and 83.

Means are provided to assure that stud 80 and bracket 81 will maintain a position of correct alignment and vertical attitude as chain 60 moves the several transfer devices through their orbit as established by the spockets 50 through 53, and such means appear in one form in Fig. 5. As there shown a continuously downward facing channel 85 is fixedly supported from frame 28 in any desired manner. The lower portion of each bracket 81 is shaped to give bearing support to a pair of rollers 86 and 87. Roller 86 rides on the top surface of channel 85, as appears clearly in Fig. 5, and thus relieves the chain 60 of all vertical loading, and roller 87 is confined to ride between the flanges of channel 85 and thus prevent any lateral swinging of the lower portion of bracket 81.

The intermediate portion of each bracket 81 is provided with a pair of co-axial bearings 90 and 91. Bearings 90 and 91 support a pivot pin 92 which, in turn, gives pivotal support to an arm 94, which is provided at its outer end with a trunnion pin 95. A pair of hook plates 98 are pivotally supported at opposite sides of arm 94 by the outward extensions of trunnion pin 95. Hook plates 98 have hook formations 100 at one end and at their opposite ends are slotted as indicated at 101 in Fig 5. Each of the brackets 81, in addition to the pair of co-axial bearings 90 and 91, has a second pair of spaced co-axial bearings 102 at its opposite face, and a pivot pin 103 is supported by bearings 102 and extends through the slots 101 of the hook plates 98.

It will be noted that the hub portion of arm 94 is provided with gear teeth, as at 106, and a gear sector 107 which meshes therewith is rotatably supported on pivot pin 103 between the slotted ends of hook plates 98. Gear sector 107 has an arm formation 110 which carries a cam follower 111 which may conprise a cam roller of various forms but is shown by way of example in the present instance as a ball end formation on arm 110.

In general, the operation of the transfer mechanism is such that the successive cam followers 111 are desired to move upwardly during the movement along conveyor chain 12 and downwardly along conveyor chain 13. Cam devices for effecting this operation are indicated generally in Figs. 3 and 4 as comprising a pair of transverse bars 115 supported from the overlying frame 28 and rigidly supporting, in turn, a follower raising cam 116 and a follower lowering cam 117, each being of generally channel formation in the illustrated instance.

It sometimes happens that a load is not removed from a conveyor at the point where and when it should be and, therefore, it is necessary to guard against the possibility of a load being in the position on conveyor chain 13 where another load would ordinarily be transferred from conveyor chain 12. The present arrangement is such that if there is a load on a given hook 24 of conveyor chain 13 when there should not be, the transfer mechanism will not attempt to move a load to that hook from the related hook 23 of chain 12.

Referring to Figs. 5 and 8, the lower wall of the entrance end of cam 116 is designated 120 and is hinged as at 121, so that it may occupy its normal lowered position as shown in Fig. 5 and as shown in full lines in Fig. 8, or be swung upwardly as shown in dot-and-dash lines in Fig. 8. In the latter case a cam follower 111 would merely pass entirely beneath cam 116 without being actuated thereby. In Fig. 8 the numeral 122 designates an electromagnet whose armature 123 attracts hinged wall portion 120 when the electromagnet is energized. The energizing conductors of the latter are designated 124 and lead to a normally open limit switch (not shown).

This limit switch will be variously disposed according to the sizes and shapes of individual loads, the pitch of loads along the conveyor chains, and the lateral spacing of the conveyor chains. It is, therefore, sufficient to state functionally that the limit switch will be so located that a load which is improperly present on a hook 24 of chain 13 will engage and close the limit switch to energize electromagnet 122 in such timed relation that the related transfer mechanism will not take a load from the related hook 23 of chain 12 in such a case.

The operation of one of the transfer devices will now be described in greater detail, it being assumed that the receiving hook 24 of chain 13 is clear and that, therefore, electromagnet 122 is de-energized and a cam follower 111 of the transfer device enters cam 116. It is to be noted that during the entire course of follower 111 through cam 116 the transfer device which it controls is properly aligned with a hook 23 of chain 12 due to the intermeshing engagement at such points between the caterpillar synchronizing chain 60 and conveyor chain 12.

As cam 116 swings follower 111 upwardly to the dot-and-dash line position of Fig. 5, gear sector 107 rotates in a counterclockwise direction, and arm 94 accordingly rotates in a clockwise direction. This moves trunnion pin 95 thereof in such manner that the hook ends 100 of hook plates 98 move successively to the two dot-and-dash line positions of Fig. 5, to straddle hook 23 and engage a bail 130 which is hanging on hook 23 and is associated with a load or article carrier. In addition to the pivotal support on trunnion pin 95, movement of hook plates 98 is additionally restrained and guided by the pin and slot connection 103, 101.

When trunnion pins 95 pass top dead-center position and after follower 111 clears the far end of cam 116, the weight of the load will cause the hook plates 98 to remain in the upper dot-and-dash line position of Fig. 5 with further over-center movement limited by engagement between pin 103 and the ends of the slots 101 of the hook plates. Thus, the load and the transfer device are in a stable gravity-locked position with the load carried by the hook plates through engagement with bail 30 as the transfer device passes along and about sprockets 51 and 50 which brings the articles to a position where they are moving parallel with conveyor chain 13.

The operation of depositing the articles on the hooks 24 of conveyor chain 13 is merely the reverse of the operation just described, cam 117 being effective to engage follower 111 and lower the same in an opposite manner to the previous operation of cam 116. It is accordingly not necessary to repeat a detailed description of the reverse procedure which effects this load delivering operation.

What is claimed is:

1. A conveyor system comprising a pair of independent endless conveyor chains each having therealong a uniformly spaced series of article supports, synchronizing means comprising an endless caterpillar chain and sprocket means for supporting and guiding the same with longitudinal portions thereof in meshing engagement with a longitudinal portion of each of said conveyor chains, a series of article engaging units carried by said caterpillar chain and spaced therealong in registry with said article supports, means operable by and upon movement of said caterpillar chain in longitudinal meshing engagement with one of said conveyor chains for operating the article engaging units successively to remove articles from registering article supports of said one conveyor chain to said synchronizing means for movement therewith to the other conveyor chain, and means operable by and upon movement of said caterpillar chain in longitudinal meshing engagement with said other conveyor chain for successively transferring such articles from said synchronizing means to registering article supports of said other conveyor chain.

2. A conveyor system comprising a pair of independent endless conveyor chains each having therealong a uniformly spaced series of article supports, synchronizing means comprising an endless caterpillar chain and sprocket drive means therefor, said caterpillar chain having longitudinal portions thereof in meshing engagement with a longitudinal portion of each of said conveyor chains, a series of article engaging units carried by said caterpillar chain and spaced therealong in registry with said article supports, means operable by and upon movement of said caterpillar chain in longitudinal meshing engagement with one of said conveyor chains for operating the article engaging units successively to remove articles from registering article supports of said one conveyor chain to said synchronizing means for movement therewith to the other conveyor chain, and means operable by and upon movement of said caterpillar chain in longitudinal meshing engagement with said other conveyor chain for successively transferring such articles from said synchronizing means to registering article supports of said other conveyor chain.

3. A conveyor system comprising a pair of independent endless conveyor chains each having therealong a uniformly spaced series of article supports, synchronizing means comprising an endless caterpillar chain and sprocket means for supporting and guiding the same with a longitudinal portion thereof in meshing engagement with a longitudinal portion of each of said conveyor chains, a series of transfer units carried by said caterpillar chain and spaced therealong in registry with said article supports, means operable by and upon movement of said caterpillar chain in longitudinal meshing engagement with one of said conveyor chains for operating the transfer units successively to remove articles from registering article supports for movement with the synchronizing means to the other conveyor chain, and means operable by and upon movement of said caterpillar chain in longitudinal meshing engagement with said other conveyor chain for successively transferring such articles to registering article supports of said other conveyor chain.

4. A conveyor system comprising a pair of independent endless conveyor chains each having therealong a uniformly spaced series of article supports, synchronizing means comprising an endless caterpillar chain and sprocket drive means therefor, said caterpillar chain having longitudinal portions thereof in meshing engagement with a longitudinal portion of each of said conveyor chains, a series of transfer units carried by said caterpillar chain and spaced therealong in registry with said article supports, means operable by and upon movement of said caterpillar chain in longitudinal meshing engagement with one of said conveyor chains for operating the transfer units successively to remove articles from registering article supports for movement with the synchronizing means to the other conveyor chain, and means operable by and upon movement of said caterpillar chain in longitudinal meshing engagement with said other conveyor chain for successively transferring such articles to registering article supports of said other conveyor chain.

5. A conveyor system comprising a pair of independent endless conveyor chains arranged with portions of each extending parallel and with the parallel portions movable in opposite directions, and endless caterpillar chain and sprocket means disposed between said parallel portions with rectilinear portions of said chain meshing with both of said conveyor chains to synchronize the portions thereof engaged by said caterpillar chain, transfer means carried by said chain and sprocket means and movable by and upon movement thereof and in timed relation therewith to remove successive loads from one of said conveyor chains, carry such loads to the other conveyor chain by movement of said chain and sprocket means, and deliver successive loads to said other conveyor chain.

6. A conveyor system comprising a pair of independent endless conveyor chains arranged with portions of each extending parallel and with the parallel portions movable in opposite directions, caterpillar chain means disposed between said parallel portions and meshing with both of said conveyor chains to synchronize the portions thereof engaged by said caterpillar chain means, transfer means carried by said caterpillar chain means and movable by and upon movement thereof and in timed relation therewith to remove successive loads from one of said conveyor chains, carry such loads successively to the other conveyor chain, and deliver successive loads to said other conveyor chain.

NELSON L. MABREY.

REFERENCES CITED

The following references are of record in the file of this patent:

UNITED STATES PATENTS

| Number | Name | Date |
|---|---|---|
| 1,817,970 | Da Costa | Aug. 11, 1931 |
| 2,120,052 | Bishop | June 7, 1938 |